(12) United States Patent
Kawaguchi et al.

(10) Patent No.: US 11,575,196 B2
(45) Date of Patent: Feb. 7, 2023

(54) ANTENNA DEVICE

(71) Applicants: DENSO CORPORATION, Kariya (JP); SOKEN, INC., Nisshin (JP)

(72) Inventors: Kazushi Kawaguchi, Nisshin (JP); Kazumasa Sakurai, Nisshin (JP); Toshiya Sakai, Nisshin (JP); Asahi Kondo, Kariya (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 1057 days.

(21) Appl. No.: 16/061,836

(22) PCT Filed: Dec. 15, 2016

(86) PCT No.: PCT/JP2016/087407
§ 371 (c)(1),
(2) Date: Jun. 13, 2018

(87) PCT Pub. No.: WO2017/104754
PCT Pub. Date: Jun. 22, 2017

(65) Prior Publication Data
US 2018/0366818 A1 Dec. 20, 2018

(30) Foreign Application Priority Data

Dec. 15, 2015 (JP) .................................. 2015-244384
Sep. 8, 2016 (JP) .............................. JP2016-175795

(51) Int. Cl.
*H01Q 1/38* (2006.01)
*H01Q 19/00* (2006.01)
(Continued)

(52) U.S. Cl.
CPC ............. *H01Q 1/38* (2013.01); *H01Q 1/3233* (2013.01); *H01Q 1/3283* (2013.01); *H01Q 1/48* (2013.01);
(Continued)

(58) Field of Classification Search
CPC ...... H01Q 1/38; H01Q 1/3233; H01Q 1/3283; H01Q 1/48; H01Q 15/006; H01Q 19/005; H01Q 21/065
See application file for complete search history.

(56) References Cited

U.S. PATENT DOCUMENTS 6,262,495 B1 7/2001 Yablonovitch et al.
2010/0302120 A1 12/2010 Crouch
(Continued)

FOREIGN PATENT DOCUMENTS

JP 2002-510886 A 4/2002
JP 2003-304113 A 10/2003
(Continued)

OTHER PUBLICATIONS

Chamo et al., A Broadband UHF Antenna on a Non-Uniform Aperiodic (NUA) EBG Surface, 2013, IEEE Antennas and Propagation Society International Symposium Proceedings, 2013, pp. 268-269.
(Continued)

*Primary Examiner* — Andrea Lindgren Baltzell
*Assistant Examiner* — Amal Patel
(74) *Attorney, Agent, or Firm* — Maschoff Brennan

(57) ABSTRACT

An antenna device includes a dielectric substrate, a ground plate arranged on a first surface of the dielectric substrate, an antenna part arranged on a second surface of the dielectric substrate, and a reflecting part. The reflecting part is arranged around the antenna part and has a plurality of conductor patches each functioning as a reflecting plate. The plurality of conductor patches form a plurality of blocks aligned along a predetermined block arrangement direction. The plurality of blocks are configured such that phases of reflected waves at an operating frequency are different for each of the blocks and phase differences of reflected waves (Continued)

between adjacent blocks are non-uniformly different for each of the adjacent blocks.

18 Claims, 13 Drawing Sheets

(51) Int. Cl.
    *H01Q 21/06*     (2006.01)
    *H01Q 1/32*     (2006.01)
    *H01Q 1/48*     (2006.01)
    *H01Q 15/00*     (2006.01)
    *H01Q 9/04*     (2006.01)
    *G01S 13/931*     (2020.01)

(52) U.S. Cl.
    CPC ......... *H01Q 15/006* (2013.01); *H01Q 19/005* (2013.01); *H01Q 21/065* (2013.01); *G01S 2013/93275* (2020.01); *H01Q 9/0407* (2013.01)

(56) References Cited

U.S. PATENT DOCUMENTS

| | | |
|---|---|---|
| 2012/0146868 A1 | 6/2012 | Kim |
| 2015/0070246 A1* | 3/2015 | Maruyama ........... H01Q 15/008 343/912 |
| 2015/0084803 A1* | 3/2015 | Purden .................... G01S 7/038 342/1 |
| 2015/0378006 A1 | 12/2015 | Ishida et al. |
| 2017/0179586 A1* | 6/2017 | Meyer .................. H01Q 21/245 |

FOREIGN PATENT DOCUMENTS

| | | |
|---|---|---|
| JP | 2009-207078 A | 9/2009 |
| JP | 2011-193345 A | 9/2011 |
| JP | 5485477 B1 | 5/2014 |
| WO | WO 2010/138731 A1 | 12/2010 |
| WO | WO 2015/111557 A1 | 7/2015 |

OTHER PUBLICATIONS

Chen et al., High-Efficiency Microstrip Pat Patch Antennas Using Non-Periodic Artificial Magnetic Conductor Structure, 2015, Asia-Pacific Microwave Conference Proceedings, vol. 1, 2015, pp. 1-3.

Chen et al., Scattering Control Using Square and Hexagonal Checkerboard Surfaces, 2015, International Conference on Advanced Technologies for Communications, IEEE Communications Society, Oct. 2015, pp. 358-361.

* cited by examiner

NORMAL SUBSTRATE

PHASE DELAY

EQUAL PHASE DIFFERENCE
(CORRESPONDING TO REFLECTION AT PLANE REFRACTIVE SUBSTRATE)

PHASE DELAY

TILTED PHASE DIFFERENCE
(CORRESPONDING TO REFLECTION AT CURVED SUBSTRATE)

PHASE DIFFERENCE WITH RESPECT TO B1 [deg]

|  | B1 | B2 | B3 | B4 | B5 | B6 | B7 |
|---|---|---|---|---|---|---|---|
| COMPARATIVE EXAMPLE 1 : NORMAL SUBSTRATE | 0 | 0 | 0 | 0 | 0 | 0 | 0 |
| COMPARATIVE EXAMPLE 2 : CONSTANT PHASE DIFFERENCE 100deg | 0 | 100 | 200 | 300 | 400 | 500 | 600 |
| EXAMPLE 1 : INCREASED WIDTH OF PHASE DIFFERENCE 30deg | 0 | 30 | 90 | 180 | 300 | 450 | 630 |
| EXAMPLE 2 : INCREASED WIDTH OF PHASE DIFFERENCE 50deg | 0 | 50 | 150 | 300 | 500 | 750 | 1050 |

PHASE DIFFERENCE WITH RESPECT TO B1 [deg]

| | B1 | B2 | B3 | B4 | B5 | B6 | B7 |
|---|---|---|---|---|---|---|---|
| COMPARATIVE EXAMPLE 3: NORMAL SUBSTRATE | 0 | 0 | 0 | 0 | 0 | 0 | 0 |
| COMPARATIVE EXAMPLE 4: CONSTANT PHASE DIFFERENCE 90deg | 0 | 90 | 180 | 270 | 360 | 450 | 540 |
| EXAMPLE 3: CONSTANT PHASE DIFFERENCE 60deg | 0 | 60 | 120 | 180 | 240 | 300 | 360 |

— EXAMPLE 3 (WITH ADDITIONAL FUNCTION PART : PHASE DIFFERENCE 60deg)
········ EXAMPLE 4 (WITH ADDITIONAL FUNCTION PART : PHASE DIFFERENCE 90deg)
—··—··— COMPARATIVE EXAMPLE 3 (NORMAL SUBSTRATE)

— EXAMPLE 3 (WITH ADDITIONAL FUNCTION PART : PHASE DIFFERENCE 60deg)
········ EXAMPLE 4 (WITH ADDITIONAL FUNCTION PART : PHASE DIFFERENCE 90deg)

— EXAMPLE 3 (WITH ADDITIONAL FUNCTION PART : PHASE DIFFERENCE 60deg)
—·—·— COMPARATIVE EXAMPLE 3 (NORMAL SUBSTRATE)
-------- COMPARATIVE EXAMPLE 5 (WITH EBG)

ANTENNA DEVICE

CROSS-REFERENCE TO RELATED APPLICATION

This application is the U.S. national phase of International Application No. PCT/JP2016/087407 filed Dec. 15, 2016 which designated the U.S. and claims priority to Japanese Patent Application No. 2015-244384 filed Dec. 15, 2015 and Japanese Patent Application No. 2016-175795 filed Sep. 8, 2016, the descriptions of which are incorporated herein by reference.

TECHNICAL FIELD

The present disclosure relates to an antenna device using a dielectric substrate.

BACKGROUND ART

An antenna formed on a dielectric substrate has been used for a radar, for example, on a mobile object, such as a vehicle or an airplane, for monitoring the surroundings of the mobile object.

When using such type of antenna for vehicle radar apparatus, the antenna may be mounted inside a vehicle bumper, for example. In this case, it has been known that part of radio waves radiated from the antenna reflect at an inner wall of the bumper, and further, re-reflect at a radiation plane of the antenna, and due to the re-reflected waves interfering with the radiated waves, the radiation characteristic of the antenna is adversely affected.

Meanwhile, PTL 1 described below discloses a technique for directing a reflection direction of electromagnetic waves towards a desired direction using an electromagnetic wave reflection plane of a flat substrate structure. The electromagnetic wave reflection plane of the flat substrate structure includes a plurality of conductor patches arranged at a predetermined gap and connecting elements for electrically connecting the conductor patches on a surface of the substrate having the other surface on which a ground plate is formed. By forming the connecting elements with capacitance or inductance that increases or decreases according to an arrangement position along one desired direction, a wavefront of reflected waves reflected at the electromagnetic wave reflection plane can be tilted.

Additionally, it is also been known with this type of antenna that radiation different from main antenna radiation occurs at a substrate end or the like, due to surface waves propagating on the substrate surface, which leads to disturbance in directivity.

Meanwhile, for example, PTL 2 described below discloses a technique for preventing disturbance in directivity by forming, on a substrate, a structure having a band gap (hereinafter referred to as "EBG") for blocking propagation of surface waves at a specific frequency used at antenna. The EBG has a structure in which hexagonal small metal plates are two-dimensionally arranged periodically on a front surface of the substrate and connected to metal plates formed on a back surface of the substrate with through holes formed of metal.

CITATION LIST

Patent Literature

[PTL 1] JP 2011-193345 A
[PTL 2] JP 2003-304113 A

SUMMARY OF THE INVENTION

As a result of detailed examination by the inventors, there was found a problem in PTL 1 that by using the electromagnetic wave reflection plane, a strong beam, which differs from a main beam, is formed in a reflection direction of the re-reflected waves coming from the antenna radiation plane, which may cause erroneous detection of a target.

Further, as a result of detailed examination by the inventors, a problem was found in PTL 2 that by using the EBG that requires formation of through holes in the substrate, the structure of substrate becomes complex. Additionally, in principle, the EBG, using LC resonance, blocks propagation of surface waves that would deteriorate directivity. Therefore, as a result of detailed examination by the inventors, there is found a problem using the EBG that a frequency band that can be blocked is narrow, and therefore, applying the EBG to a wideband antenna is difficult.

In one aspect of the present disclosure, it is desirable to be able to provide a technique for sufficiently preventing the influence of reflected waves, even when installed in an environment where radio waves are reflected.

In another aspect of the present disclosure, it is desirable to be able to provide a technique for preventing the influence of surface waves with a simple configuration.

An antenna device according to one aspect of the present disclosure includes a dielectric substrate having a first surface and a second surface, a ground plate, an antenna part, and a reflecting part. The ground plate is arranged on the first surface of the dielectric substrate and functions as an antenna ground plane. The antenna part is arranged on the second surface of the dielectric substrate and has an antenna pattern serving as an array antenna. The reflecting part is arranged around the antenna part and has a plurality of conductor patches, each of which has a dimension smaller than a wavelength, serving as a reflecting plate at a predetermined operating frequency. Additionally, the plurality of conductor patches form a plurality of blocks aligned along a predetermined block arrangement direction. Additionally, the plurality of blocks are configured such that phases of reflected waves at the operating frequency are non-uniformly different for each of the blocks.

With such a configuration, it is possible to reflect, with the second surface of the dielectric substrate as a radiation plane, reflected waves incident on the radiation plane not in a constant direction but in various directions, that is, to scatter the reflected waves. As a result, a reflection intensity of re-reflected waves travelling toward the same direction as the radiation waves can be reduced when the reflected waves arriving from the radiation direction of the radiation waves re-reflect at the radiation plane. Therefore, the re-reflected waves can be prevented from interfering without forming a strong beam toward a specific direction caused by the re-reflected waves.

An antenna device according to another aspect of the present disclosure includes a dielectric substrate having a first surface and a second surface, a ground plate, an antenna part, and an additional function part. The ground plate is arranged on the first surface of the dielectric substrate and functions as an antenna ground plane. The antenna part is arranged on the second surface of the dielectric substrate and has an antenna pattern serving as a radiation element. The additional function part is arranged around the antenna part and has a plurality of conductor patches each having a dimension smaller than a wavelength at a predetermined operating frequency. Additionally, the plurality of conductor patches form a plurality of blocks aligned along a predetermined block arrangement direction. Phase differences between the plurality of blocks of radiation waves from the plurality of conductor patches due to surface waves propagating on a front surface of the dielectric substrate are set so that the radiation waves are radiated toward a compensation direction which is a direction providing a minimum gain in antenna characteristics in a case where the additional function part is removed.

This configuration can improve a gain in the compensation direction and can broaden the bandwidth with a simpler configuration compared to that using the EBG

DESCRIPTION OF EMBODIMENTS

Embodiments of the present disclosure will be described below with reference to drawings.

1. First Embodiment

[1-1. Configuration]

An antenna device 1 is mounted inside a bumper of a vehicle and constitutes a millimeter-wave radar that detects various targets existing around the vehicle.

Figure 1:
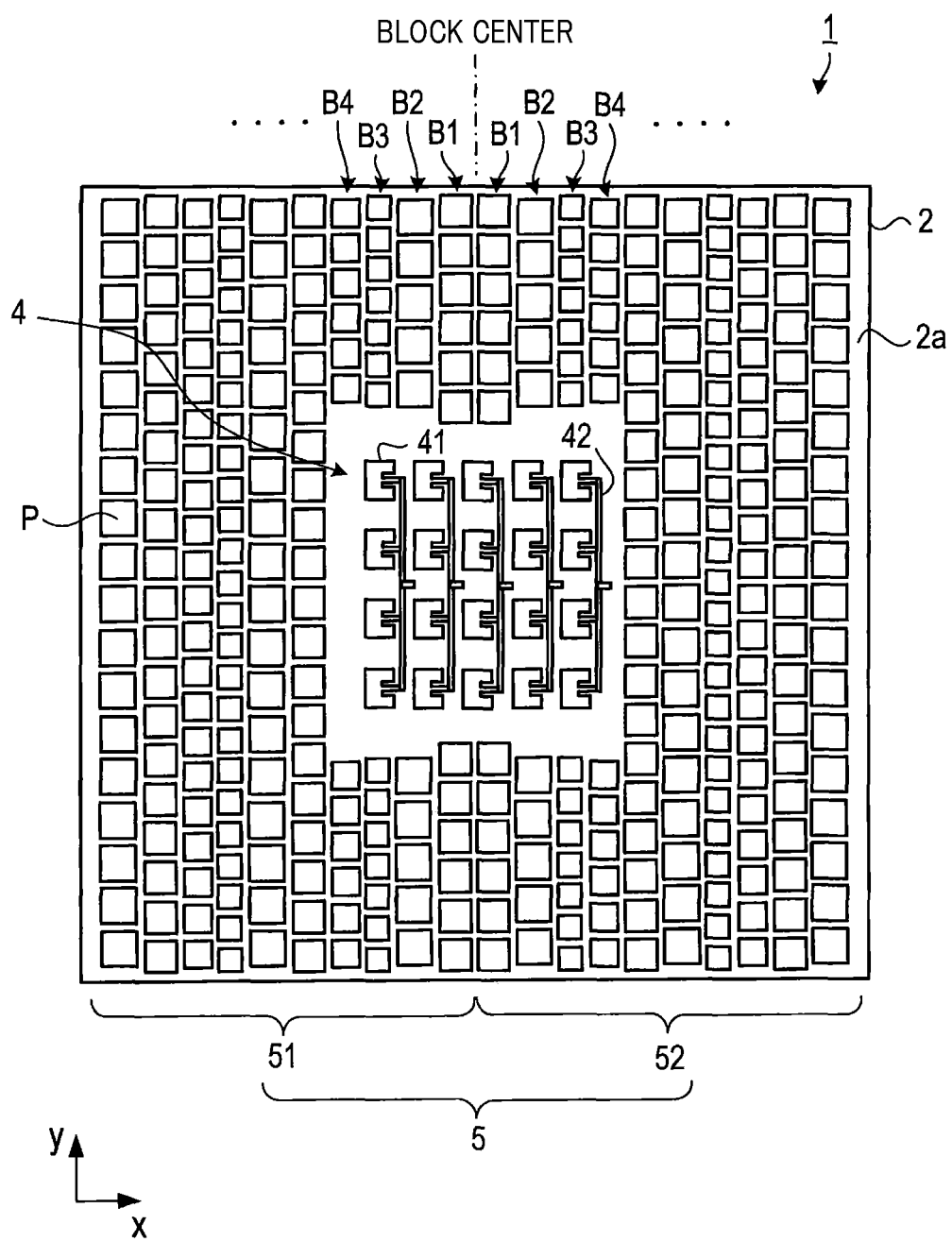
FIG. 1 is an x-y plan view that is a front view of an antenna device.
Figure 2:
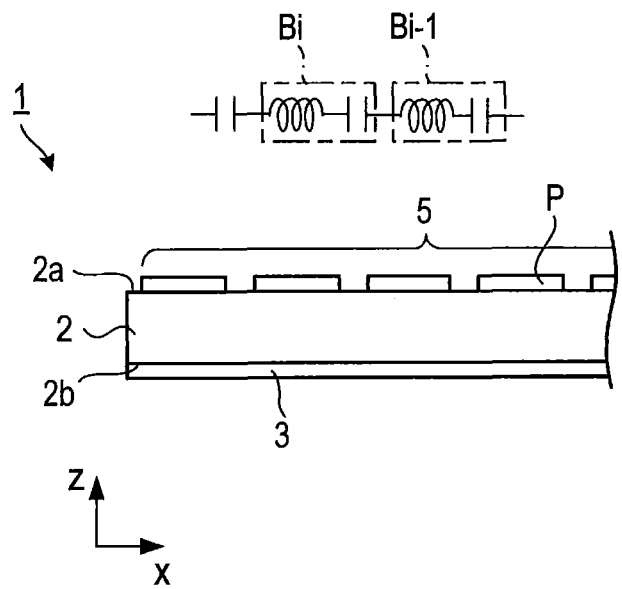
FIG. 2 is an x-z plan view that is a side view of the antenna device.

As shown in FIG. 1 and FIG. 2, the antenna device 1 is formed with copper patterns formed on a dielectric substrate 2 having a rectangular shape. In the following, the dielectric substrate 2 has one surface referred to as a substrate front surface 2a, and another surface referred to as a substrate back surface 2b. Additionally, a direction along one side of the dielectric substrate 2 is referred to as an x-axis direction, a direction along the other side orthogonal to the x-axis direction is referred to as a y-axis direction, and a normal direction of the substrate front surface 2a is referred to as a z-axis direction.

The substrate back surface 2b is formed with a ground plate 3 including a copper pattern covering the entire surface of the substrate back surface 2b. The substrate front surface 2a is formed with an antenna part 4 near a center thereof and formed with a reflecting part 5 around the antenna part 4. In the following, the substrate front surface 2a is also referred to as a radiation plane.

The antenna part 4 includes a plurality of array antennas arranged along the x-axis direction. Each array antenna includes a plurality of rectangular patch antennas 41 arranged along the y-axis direction, and feeder wires 42 for feeding power to each patch antenna 41. The antenna part 4 is configured such that a polarization direction of a radio wave radiated from the antenna part 4 coincides with the x-axis direction.

The reflecting part 5 includes a plurality of conductor patches P, which are arranged two-dimensionally, including rectangular copper patterns. Each of the conductor patches P is formed into a square shape, and a dimension of one side of the conductor patch P is set to be smaller than a wavelength λ at an operating frequency of the antenna device 1. More specifically, the dimension of one side of each of the conductor patches P is desirably not more than ¾ wavelength, and here the dimension of about ⅕ to ⅓ wavelength is used.

In the reflecting part 5, there is provided a plurality of columns of conductor patches P along the y-axis direction. In each column, the conductor patches P all having the same dimension are arranged in one line. Each column of conductor patches P forms a block B. Further, a plurality of blocks B are arranged along the x-axis direction. That is, an arrangement direction of the blocks B coincides with the x-axis direction. The dimensions of conductor patches P are different for each block B. However, the gaps between the conductor patches P in the block B and the gaps between the conductor patches P across adjacent blocks B are set to constant dimensions, respectively.

The reflecting part 5 includes two portions 51 and 52 by defining a block center as a boundary. The block center indicates a line extending along the y-axis direction and passing through a center position of the reflecting part 5 in the x-axis direction. A plurality of blocks B included in each of these two portions 51 and 52, and also a plurality of conductor patches P included in each of the blocks B are line-symmetric with respect to the block center, respectively. In the following, in each of the portions 51 and 52, a block B closest to the block center is represented as B1, and the respective blocks B, as they are further from the block center, are represented as B2, B3, . . . .

Note that, in the reflecting part 5, the conductor patch P has an inductance component. Further, the gap between conductor patches P has a capacitance component. As shown in FIG. 2, in the reflecting part 5, when represented by an equivalent circuit, series circuits each including an inductance and a capacitance are serially connected with each other, in which the number of the series circuits corresponds to the number of blocks B. In addition, with respect to a current flowing on the radiation plane 2a, the inductance component causes a phase delay and the capacitance component causes a phase lead.

By using this characteristic, each block Bi in the reflecting part 5 is designed into a structure to satisfy Conditions (1) to (3) described below. That is, (1) phase characteristics of reflected waves are line-symmetric with respect to the block center. (2) The phase delay increases as the block is further from the block center. (3) The phase difference between adjacent blocks becomes larger as the block is further from the block center. That is, the phase differences are designed to be tilted.

Here, the reflecting part 5 is designed by adjusting the dimension of the conductor patch P included in each block Bi.

[1-2. Design]

The reflecting part 5 of the antenna device 1 is designed as described below, for example.

Figure 3:
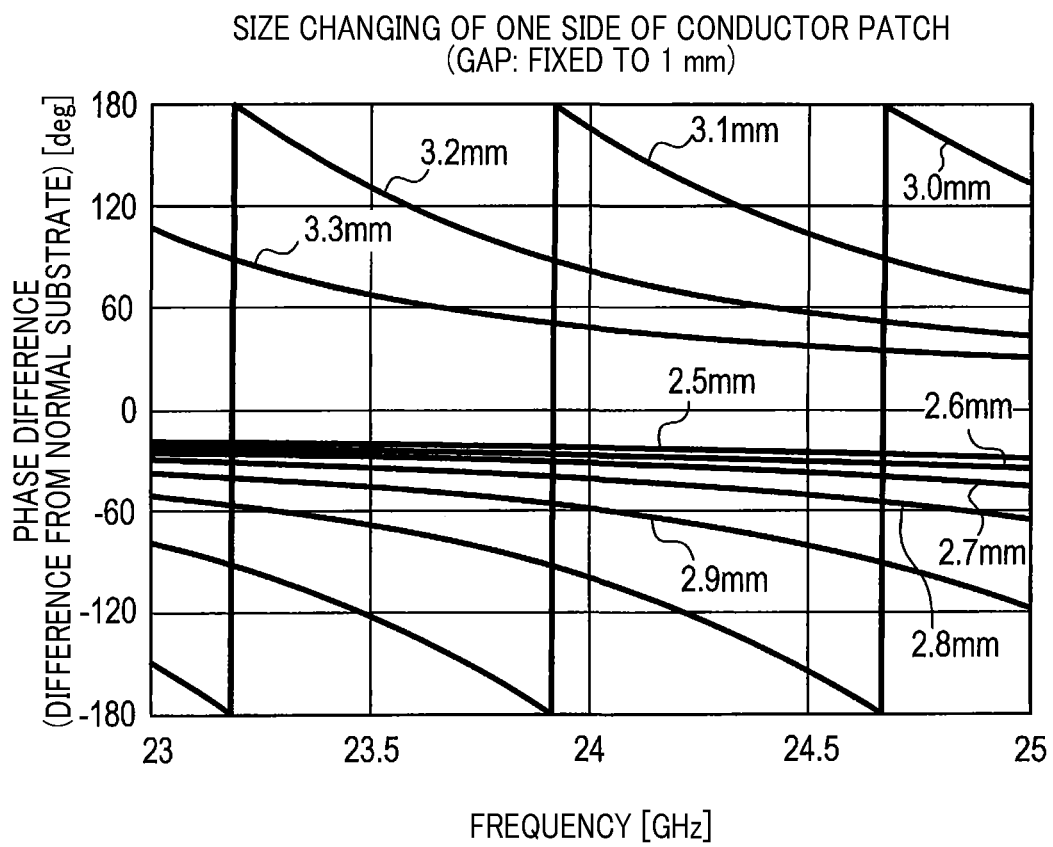
FIG. 3 is a graph showing frequency characteristics in which phases of reflected waves at conductor patches are obtained with phases of reflected waves on a normal substrate as a reference while variously changing a dimension of the conductor patches.

FIG. 3 is a graph showing reflection characteristics to be used in the design. Specifically, phase characteristics of reflected waves (hereinafter, reflection characteristics) at the conductor patch P with respect to incoming waves arriving from a front direction of the antenna are shown. Note that the reflection characteristics are based on phases of the reflected waves at a normal substrate which is a substrate without the reflecting part 5. In addition, the gap between the conductor patches P is fixed to 1 mm, and the dimension of one side of the conductor patch P is changed between 2.5 mm and 3.3 mm. That is, in a case where the dimension of the conductor patch P is constant, the phase delay increases as the operating frequency increases. Additionally, when the operating frequency is constant, the phase delay increases as the dimension of the conductor patch P increases. In FIG. 3, since the phase differences are shown in the range of −180 degrees to 180 degrees, the phase difference of −180 degrees is identical to the phase difference of 180 degrees.

First, the dimension of the conductor patch P of a block Bi serving as a reference is arbitrarily set. Next, the dimension of the conductor patch P of an adjacent block Bi having a predetermined dimension is set so as to obtain a predetermined phase difference at a predetermined operating frequency by using the relationship shown in FIG. 3. By sequentially repeating this operation, the dimensions of conductor patches P of all the blocks Bi are designed.

[1-3. Operation]

Figure 4:
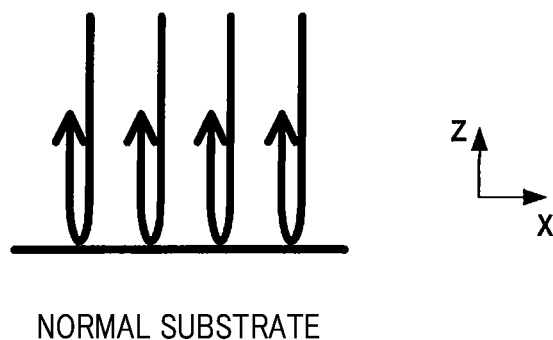
FIG. 4 is an explanatory diagram schematically illustrating a reflection direction on a radiation plane of the normal substrate without the conductor patch.

In the case of a normal substrate without the conductor patch P, or in a case where the reflecting part 5 is designed so that phase differences of the reflected waves become 0 degrees between blocks B, as shown in FIG. 4, an incident light from the z-axis direction bounces back with the same phase at any portion of the radiation plane 2a. As a result, the reflected light travels toward an arrival direction of the incident light.

Figure 5:
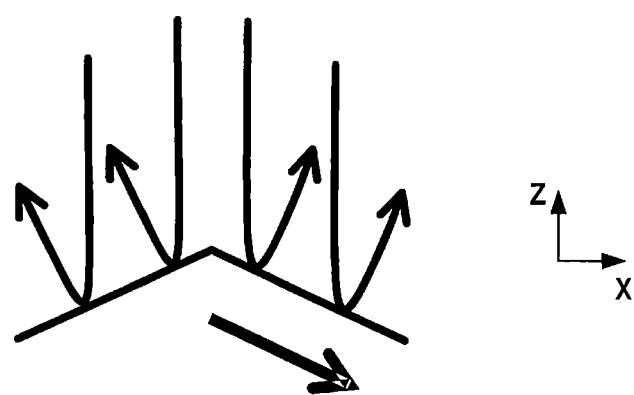
FIG. 5 is an explanatory diagram schematically illustrating a reflection direction on a radiation plane of a substrate on which phase differences of the reflected waves generated between the conductor patches across adjacent blocks are constant.

In a case where the phase difference between blocks B is constant, that is, in a case of a configuration corresponding to a conventional technique that does not satisfy the above Condition (3), as shown in FIG. 5, incident light from the z-axis direction reflects at the radiation plane 2a, and the phase delay increases as the reflected light is further from the block center. However, the phase delay is proportional to a distance from the block center. Consequently, the reflected light reflects in a definite direction at a certain angle with respect to the arrival direction of the incident light. In other words, reflection characteristics, corresponding to reflection at a plane refractive substrate that is bent into a chevron shape, can be obtained.

Figures 6, 7:
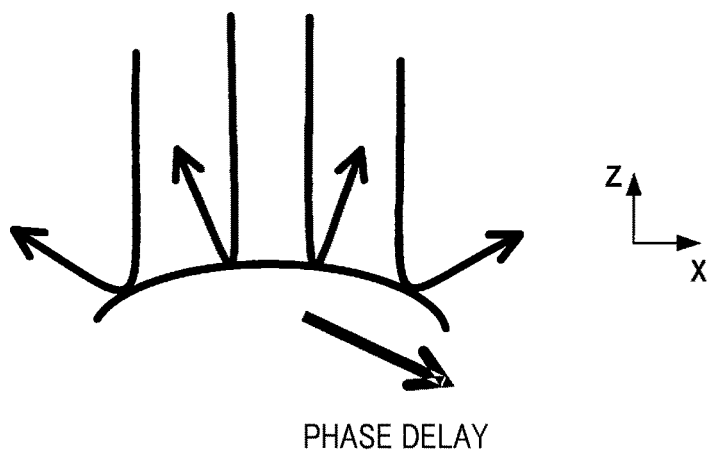
FIG. 6 is an explanatory diagram schematically illustrating a reflection direction on a radiation plane of a substrate on which phase differences of the reflected waves generated between the conductor patches across adjacent blocks are gradually increased.
FIG. 7 is a list showing phase differences of reflected waves generated between blocks in Examples 1 and 2 and Comparative Examples 1 and 2.

As shown in FIG. 6, when the phase difference between blocks B is tilted as in the present embodiment, the incident light from the z-axis direction reflects at the radiation plane 2a, and the phase delay increases as the reflected light is further from the block center. Note that the phase delay increases more rapidly as the reflected light is further from the block center. Consequently, the reflected light reflects in a direction at a certain angle with respect to the arrival direction of the incident light, and the reflection angle becomes larger as the reflected light is further from the block center. In other words, reflection characteristics corresponding to reflection at a curved substrate can be obtained, and the reflected light does not travel towards the constant direction but is scattered and travels towards various directions.

[1-4. Effect]

According to a first embodiment described above in detail, the following effects can be obtained.

(1a) Although the antenna device 1 is configured by using the flat dielectric substrate 2, the reflected waves reflected at the radiation plane 2a can be scattered around toward various direction instead of being reflected towards the front side or only in a constant direction. As a result, even when the antenna device 1 is installed in a vehicle bumper, influence of interference, caused by reflected waves from the bumper, can be prevented.

(1b) The antenna device 1 uses an inductance component of the conductor patch P and a capacitance component caused by a gap between conductor patches P. Therefore, no connecting element between the conductor patches P is required as would be required in the conventional technique. Consequently, the antenna device 1 can be applied without a problem even to a millimeter waveband for which a gap between conductor patches P is extremely narrow.

[1-5. Experiment]

The result of simulation performed on Examples 1 and 2 and Comparative Examples 1 and 2 is described next. As shown in FIG. 7, in Example 1, a width of increase in the phase difference between adjacent blocks was set to B30 degrees. In Example 2, the width of increase in the phase difference was set to 50 degrees. In Comparative Example 1, a normal substrate without the reflecting part 5 was used. In Comparative Example 2, the phase difference between blocks B was set a constant value of 100 degrees. However, the operating frequency was set to 24.15 GHz.

Figure 8:
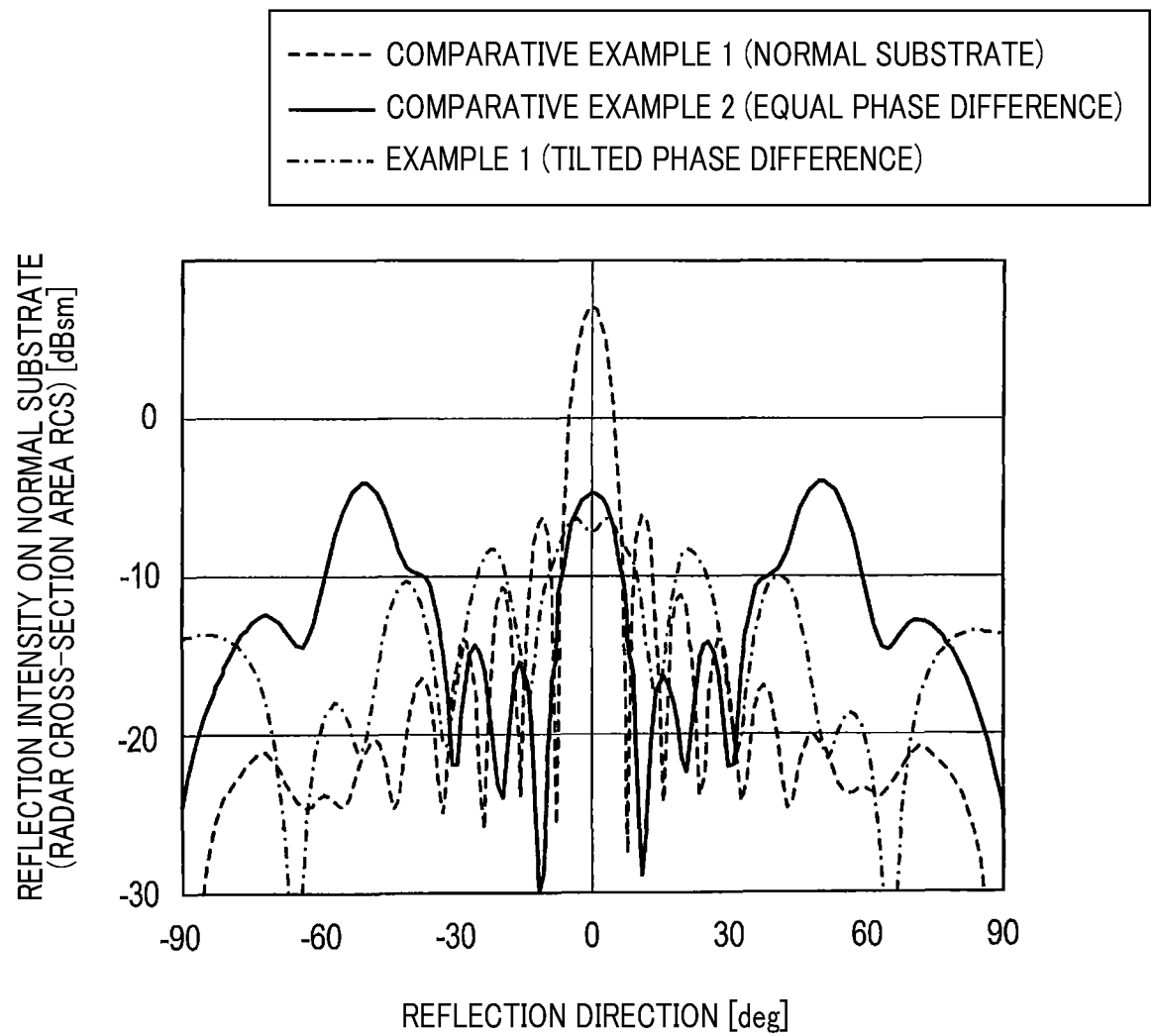
FIG. 8 is a graph showing a result of simulation for obtaining a reflection intensity when a light is made incident from a front of the antenna device, that is, a direction giving a reflection direction of 0 degree by using as a reference a reflection intensity on the normal substrate.

As shown in FIG. 8, in Comparative Example 2, although the reflection to the vicinity of a reflection direction of 0 degrees is prevented from occurring in comparison with Comparative Example 1, strong reflection occurs in the vicinity of ±50 degrees. However, in Example 1, the reflection is prevented from occurring over the entire reflection direction without strong reflection toward a specific direction.

Figure 9:
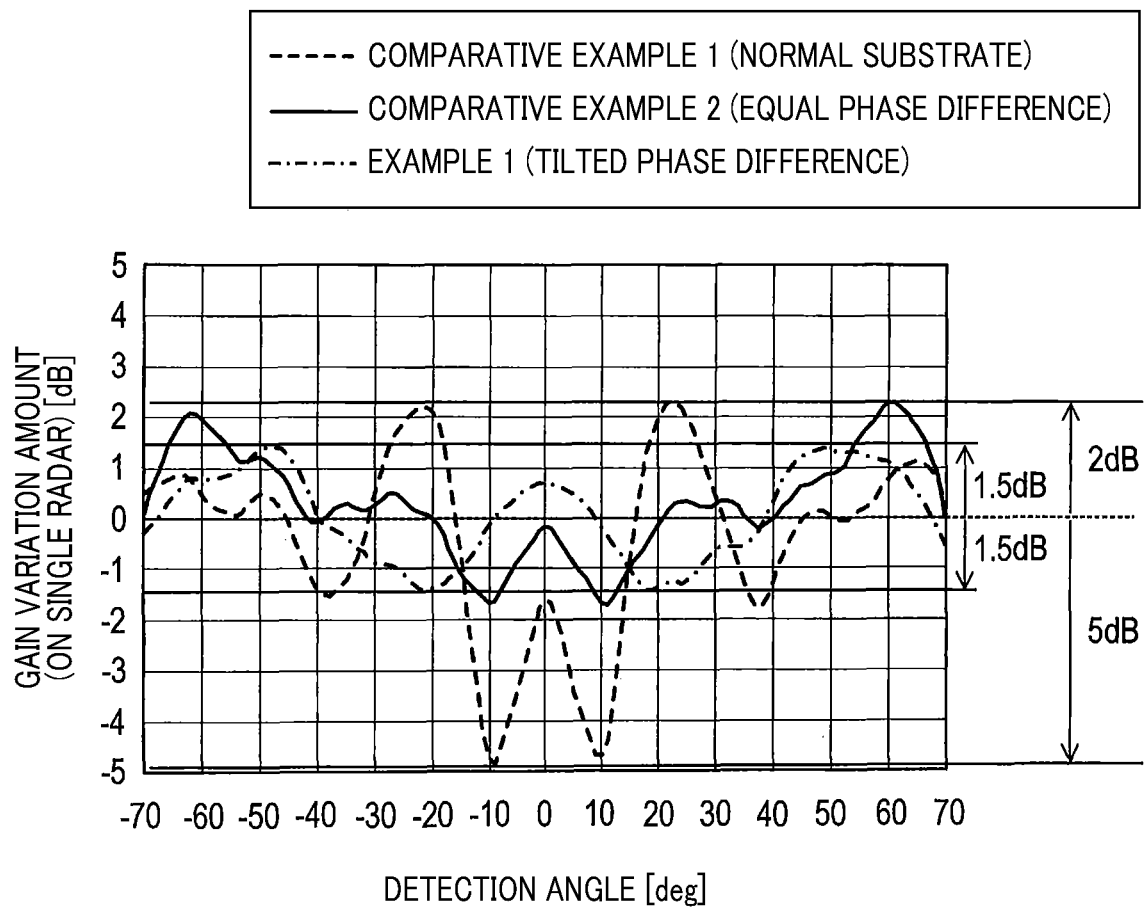
FIG. 9 is a graph showing a result of simulation for obtaining a gain variation amount of an antenna gain as a result of receiving influence of interference based on reflected waves due to existence of a bumper, using an antenna gain in the case where the bumper does not exist as a reference.
Figure 10:
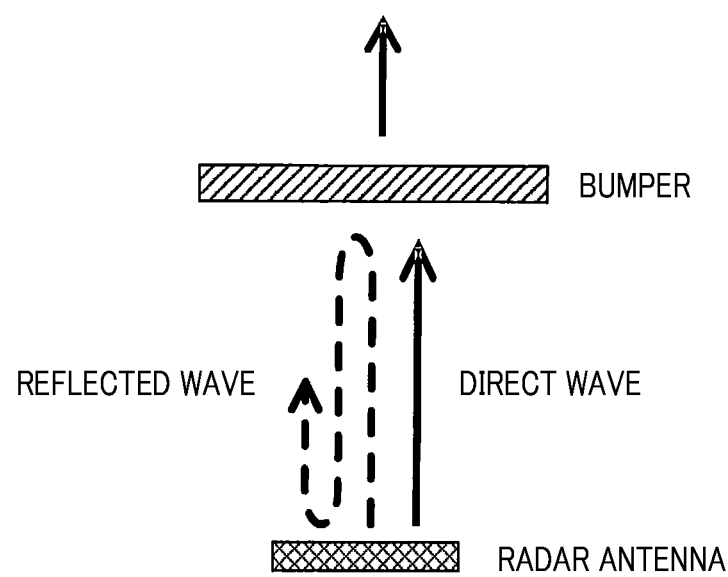
FIG. 10 is an explanatory diagram schematically illustrating reflected waves generated by the bumper.

As shown in FIG. 9, in comparison with a case where the bumper does not exist, due to the existence of the bumper, a gain variation of a maximum of 5 dB occurs in Comparative Example 1 and a maximum of 2 dB occurs in Comparative Example 2. Whereas, in Example 1, the gain variation is limited to a maximum of 1.5 dB. As shown in FIG. 10, in a case where the bumper exists, a direct wave radiated from the antenna device 1 is reflected at the bumper, and the reflected wave is re-reflected at the radiation plane 2a of the antenna device 1. Then, after interference between the re-reflected wave and the direct wave has occurred, the re-reflected wave is radiated toward outside via the bumper. Here, the distance from the radiation plane 2a to the bumper was set to 28 mm.

Figure 11:
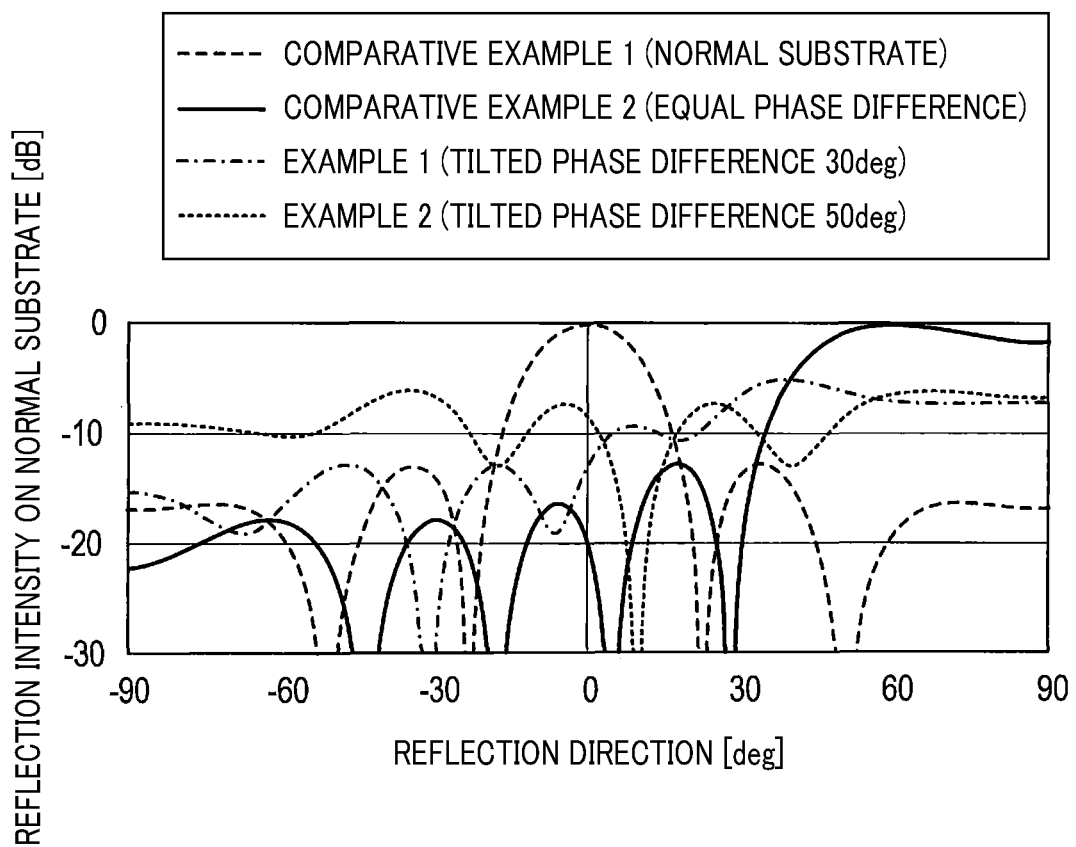
FIG. 11 is a graph showing a result of simulation for obtaining a reflection intensity in a case where a phase delay is set to be monotonically increased from one end toward another end in a block arrangement direction of the dielectric substrate.

FIG. 11 shows a result for obtaining the reflection characteristics of the reflecting part 5 including only one of the portions 51 and 52, through simulation. The simulation used here is the same as the one used for obtaining a reflection intensity in FIG. 8. In other words, shown are the reflection characteristics in a case where the phase difference between blocks B is changed not line symmetrically with respect to the block center but continuously in one direction across one end portion to another end portion in the x-axis direction. FIG. 8 is obtained by adding and synthesizing the graph of FIG. 11 and a graph obtained by horizontally flipping the graph of FIG. 11.

2. Second Embodiment

[2-1. Configuration]

An antenna device 6 is, for example, mounted in a vehicle, and used for a millimeter-wave radar for detecting various targets existing around the vehicle.

Figure 13:
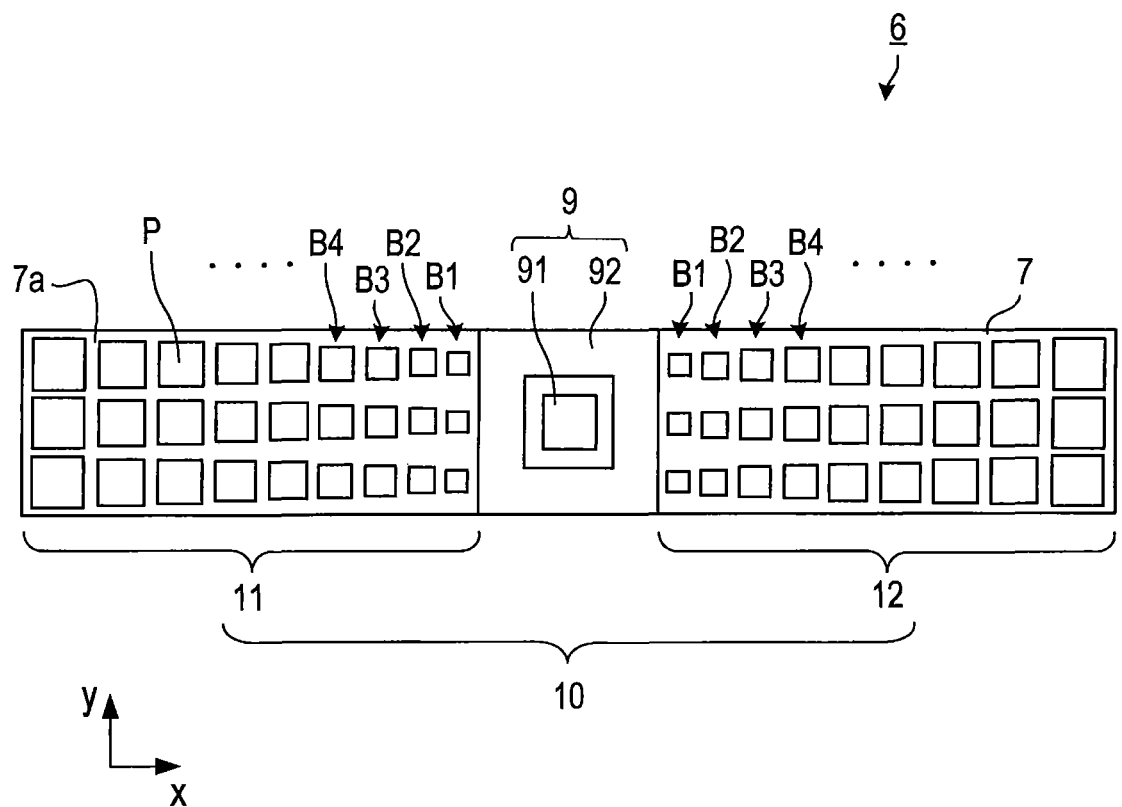
FIG. 13 is an x-y plan view that is an elevation view of an antenna device of a second embodiment.
Figure 14:
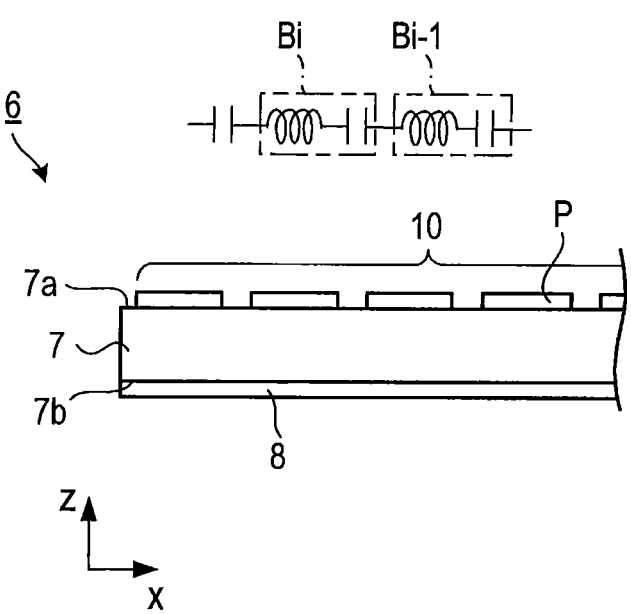
FIG. 14 is an x-z plan view that is a side view of the antenna device of the second embodiment.

As shown in FIGS. 13 and 14, the antenna device 6 includes, a dielectric substrate 7 having a rectangular shape and a copper pattern formed on the dielectric substrate 7. In the following, the dielectric substrate 7 has one surface referred to as a substrate front surface 7a, and another surface referred to as a substrate back surface 7b. Additionally, a direction along a long side of the dielectric substrate 7 is referred to as an x-axis direction, a direction along the other short side orthogonal to the x-axis direction is referred to as a y-axis direction, and a normal direction of the substrate front surface 7a is referred to as a z-axis direction.

The substrate back surface 7b is formed with a ground plate 8 including a copper pattern covering the entire surface of the substrate back surface 7b. The substrate front surface 7a is formed with an antenna part 9 near the center in the x-axis direction and formed with an additional function part 10 on both sides in the x-axis direction sandwiching the antenna part 9 therebetween. In the following, the substrate front surface 7a will also be referred to as a radiation plane.

The antenna part 9 includes a rectangular patch antenna 91 formed of a copper pattern and a ground plate pattern 92 formed around the patch antenna 91. Power is fed to the patch antenna 91 so that a polarization direction of a radiated radio wave coincides with the x-axis direction.

The additional function part 10 includes a plurality of conductor patches P, which are arranged two-dimensionally, including rectangular copper patterns. Each of the conductor patches P is formed into a square shape, and a dimension of one side thereof is set to be smaller than a wavelength λ at an operating frequency of the antenna device 6. More specifically, the dimension of one side of each of the conductor patches P is desirably not more than ¾ wavelength, and here the dimension of about ⅕ to ⅓ wavelength is used.

In the additional function part 10, there is provided a plurality of columns of conductor patches P along the y-axis direction. In each column, the conductor patches P all having the same dimension are arranged in one line. Each column of conductor patches P forms a block B. Further, a plurality of blocks B are arranged along the x-axis direction. That is, an arrangement direction of the blocks B coincides with the x-axis direction. The dimensions of conductor patches P are different for each block B. Note that the gaps between the conductor patches P in the block B are set to a constant dimension different for each of the blocks. Additionally, each of the gaps between the conductor patches P across adjacent blocks B is set to a constant dimension.

The additional function part 10 includes two portions 11 and 12 arranged on both sides of the antenna part 9. A plurality of blocks B and a plurality of conductor patches P included in each of these two portions 11 and 12 are symmetric with respect to the antenna part 9. In the following, in each of the portions 11 and 12, a block B closest to the antenna part 9 is represented as B1, and the respective blocks B, as they are further from the block center, are represented as B2, B3, . . . .

Note that, in the additional function part 10, the conductor patch P has an inductance component. Further, the gap between conductor patches P has a capacitance component. As shown in FIG. 14, in the additional function part 10, when represented by an equivalent circuit, series circuits each including an inductance and a capacitance are serially connected with each other, in which the number of the series circuits corresponds to the number of blocks B. In addition, the inductance component causes a phase delay and the capacitance component causes a phase lead, with respect to a current flowing on the radiation plane 7a, that is, surface waves propagating on the radiation plane 7a.

By using this characteristic, each block Bi in the additional function part 10 is designed into a structure to satisfy Conditions (4) to (6) described below. That is, (4) phase characteristics of reflected waves are line-symmetric with respect to the block center. (5) The phase delay increases as the reflected light is further from the block center. (6) The directivity of surface radiation waves radiated from the additional function part 10 is directed toward a compensation direction, due to the surface waves propagating along the x-axis on the radiation plane 7a. Note that the compensation direction is defined as a direction providing a minimum gain in the antenna characteristics (in the following, basic characteristics) in the normal substrate which is a substrate without the additional function part 10.

Here, the additional function part 10 is designed by adjusting the dimension of the conductor patch P included in each block Bi.

[2-2. Design]

The additional function part 10 of the antenna device 6 is designed as described below, for example.

Figures 15, 16:
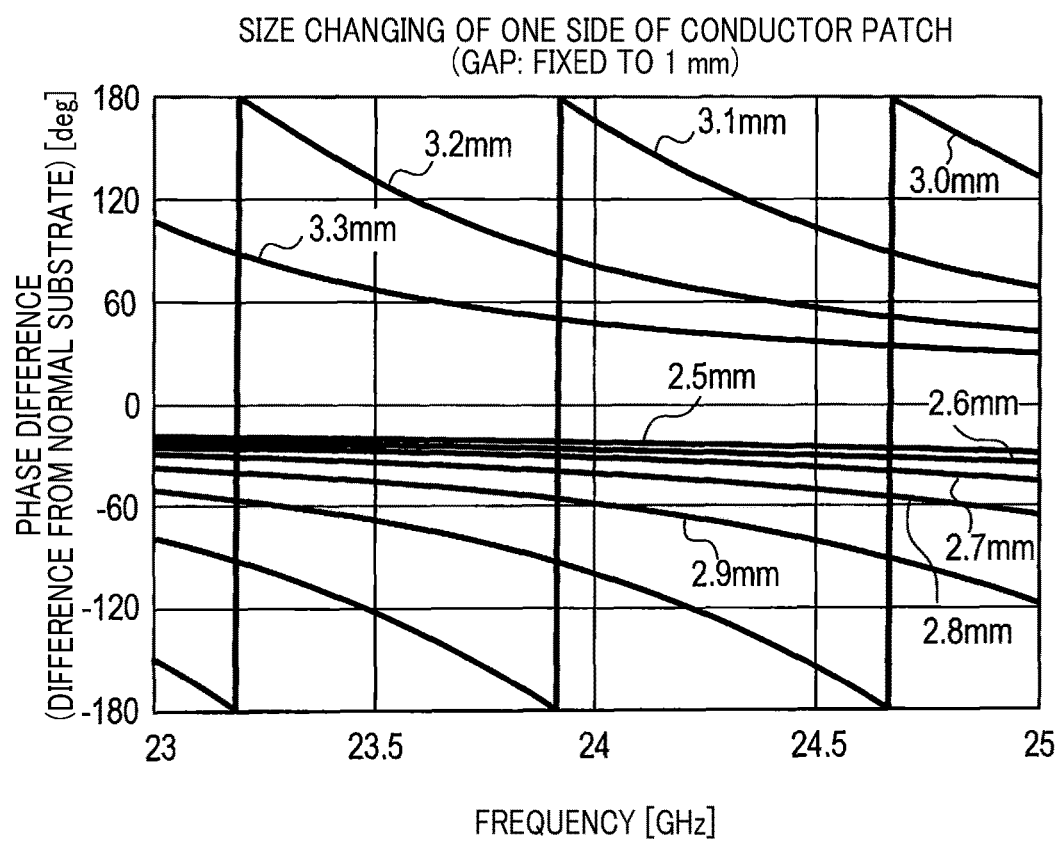
FIG. 15 is a graph showing frequency characteristics in which phases of reflected waves at the conductor patches are obtained, while variously changing a dimension of the conductor patches.
FIG. 16 is a list showing phase differences of surface radiation waves generated between blocks in Example 3 and Comparative Examples 3 and 4.

FIG. 15 is a graph showing reflection characteristics to be used in the designing. Specifically, phase characteristics of reflected waves (hereinafter, reflection characteristics) at the conductor patch P with respect to incoming waves arriving from a front direction of the antenna are shown. Note that, the reflection characteristics are based on phases of the reflected waves at a normal substrate which is a substrate without the additional function part 10. In addition, the gap between the conductor patches P is fixed to 1 mm, and the dimension of one side of the conductor patch P is changed between 2.5 mm and 3.3 mm. That is, in a case where the dimension of the conductor patch P is constant, the phase delay increases as the operating frequency increases. Additionally, when the operating frequency is constant, the phase delay increases as the dimension of the conductor patch P increases. In FIG. 15, since the phase differences are shown in the range of −180 degrees to 180 degrees, the phase difference of −180 degrees is identified with the phase difference of 180 degrees.

First, the dimension of the conductor patch P of a block Bi serving as a reference is arbitrarily set. Next, the dimension of the conductor patch P of an adjacent block Bi having a predetermined dimension is set so as to obtain a predetermined phase difference at a predetermined operating frequency by using the relationship shown in FIG. 15. Through this operation, a phase of reflected waves without having to consider propagation delay of the surface waves can be achieved. Therefore, correction considering propagation delay of the surface waves becomes necessary for obtaining a phase of the surface radiation waves. In the following, by sequentially repeating this operation, the dimensions of conductor patches P of all the blocks Bi are designed.

[2-3. Effect]

According to a second embodiment described above in detail, the following effect can be obtained.

(2a) In the antenna device 6, a gain in a direction providing a minimum gain in the basic characteristics is made to increase by using the surface radiation waves radiated from the conductor patches P included in the additional function part 10 on the basis of the surface waves propagating on the radiation plane 7a. Accordingly, the antenna characteristics of the entire antenna device 6 can be improved, specifically the bandwidth in the entire antenna device 6 can be broadened.

(2b) In the antenna device 6, the additional function part 10 includes a plurality of conductor patches P formed on the radiation plane 7a. Therefore, unlike the conventional technique using EBG, since it is not necessary to provide a through hole that connects the conductor patch P with the ground plate 8 formed on the substrate back surface 7b, the configuration of the antenna device 6 can be simplified.

(2c) In the antenna device 6, the radiation direction of the surface reflection waves is adjusted by using the phase difference between blocks B, each including a plurality of conductor patches P. This makes it possible to realize a wideband antenna differently to the conventional technique using an EBG in which a stopband bandwidth of the surface wave and furthermore a usage bandwidth of the antenna are determined by LC resonance.

[2-4. Experiment]

The results of simulation performed on Example 3 and Comparative Examples 3, 4 and 5 will now be explained. In Example 3, the phase difference of the surface radiation wave (in the following, radiation phase difference) between blocks B was set to 60 degrees. In Comparative Example 3, the normal substrate without the additional function part 10 was used. In Comparative Example 4, the radiation phase difference was set to 90 degrees. In Comparative Example 5, a portion having an EBG structure was provided in place of the additional function part 10. Note that the operating frequency was set to 24.15 GHz. FIG. 16 is a list indicating radiation phases of each block with the block B1 as a reference for Comparative Examples 3 and 4 and Example 3.

Figure 17:
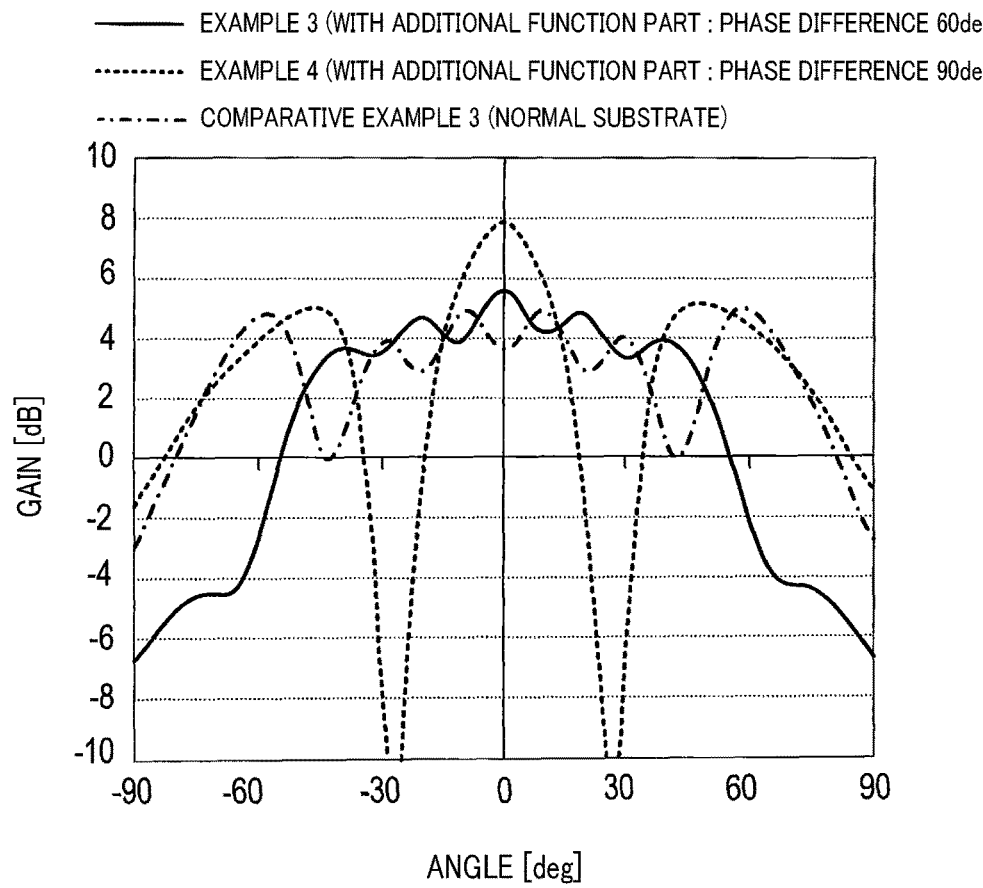
FIG. 17 is a graph showing a result of simulation for obtaining radiation characteristics of entire antenna device while changing presence/absence of an additional function part and a radiation phase difference of surface current between antenna elements constituting the additional function part.

As shown in FIG. 17, Comparative Example 3 has the antenna characteristics (that is, basic characteristics) providing the minimum gain in the vicinity of a reflection direction of 40 to 45 degrees (hereinafter, compensation direction). Whereas, Example 3 has the improved gain in the compensation direction in comparison with Comparative Example 3, and thus has the antenna characteristics in which the bandwidth is broadened and side lobes are suppressed from increasing. Furthermore, Comparative Example 4, in which the radiation phase difference is set to a value different from that in Example 3, has the antenna characteristics in which the bandwidth is narrow even in comparison with Comparative Example 3 and the side lobe is not suppressed from increasing. That is, the radiation phase difference of the additional function part 10 is required to be appropriately optimized in accordance with the basic characteristics.

Figure 18:
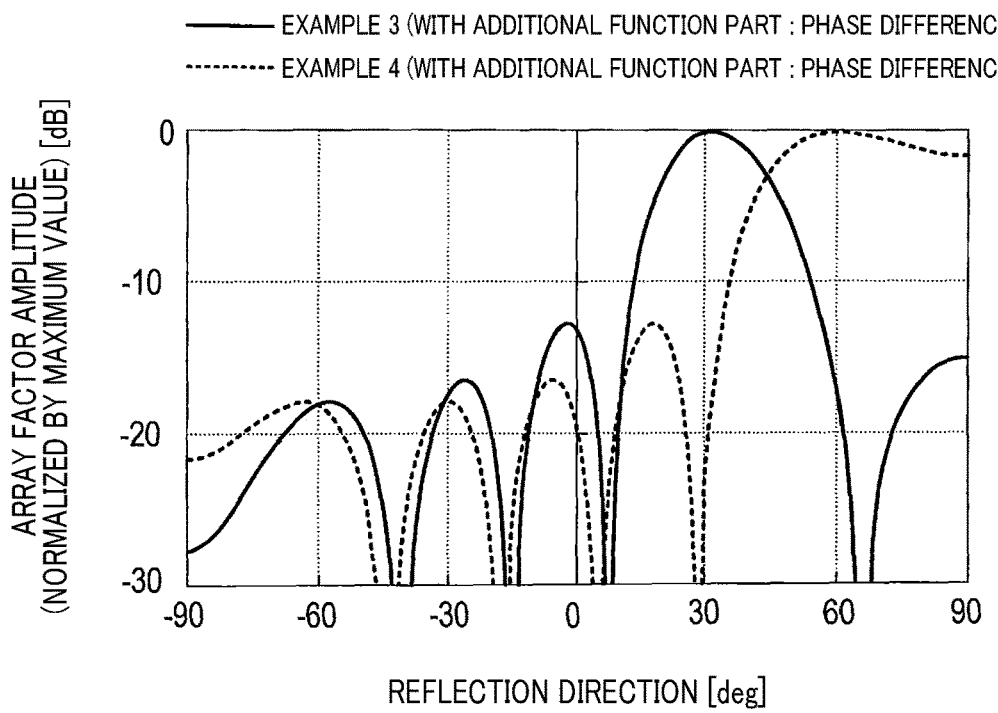
FIG. 18 is a graph showing a result of simulation for obtaining radiation characteristics of the additional function part formed on one side of the antenna.

FIG. 18 shows a result of obtaining the antenna characteristics of only one of the portions 11 and 12 included in the additional function part 10 through simulation. The graph of Example 3 and Comparative Example 4 is obtained by adding and synthesizing the graph of FIG. 18 and a graph obtained by horizontally flipping the graph of FIG. 18.

Figure 19:
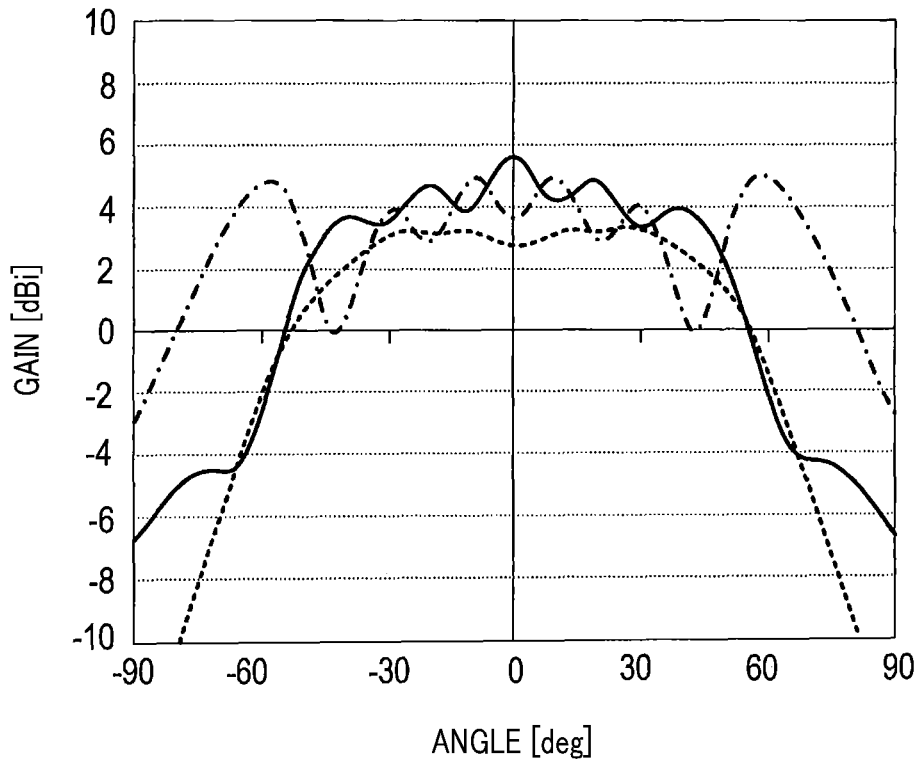
FIG. 19 is a graph showing a result of simulation for obtaining radiation characteristics of the entire antenna device for each of the one with the additional function part, the one without the additional function part, and the one provided with an EBG in place of the additional function part.

As shown in FIG. 19, it is apparent that Example 3 having the additional function part 10 can obtain the antenna characteristics equal to or higher, in terms of gain and bandwidth, than those of Comparative Example 5 using the EBG structure, which is more complex than the additional function part 10. That is, an effect equivalent to the configuration of the antenna device using the EBG structure can be achieved with a simpler configuration.

3. Other Embodiments

The embodiments of the present disclosure have been described above, but the present disclosure can be variously modified and practiced without being limited to the above-described embodiments.

Figure 12:
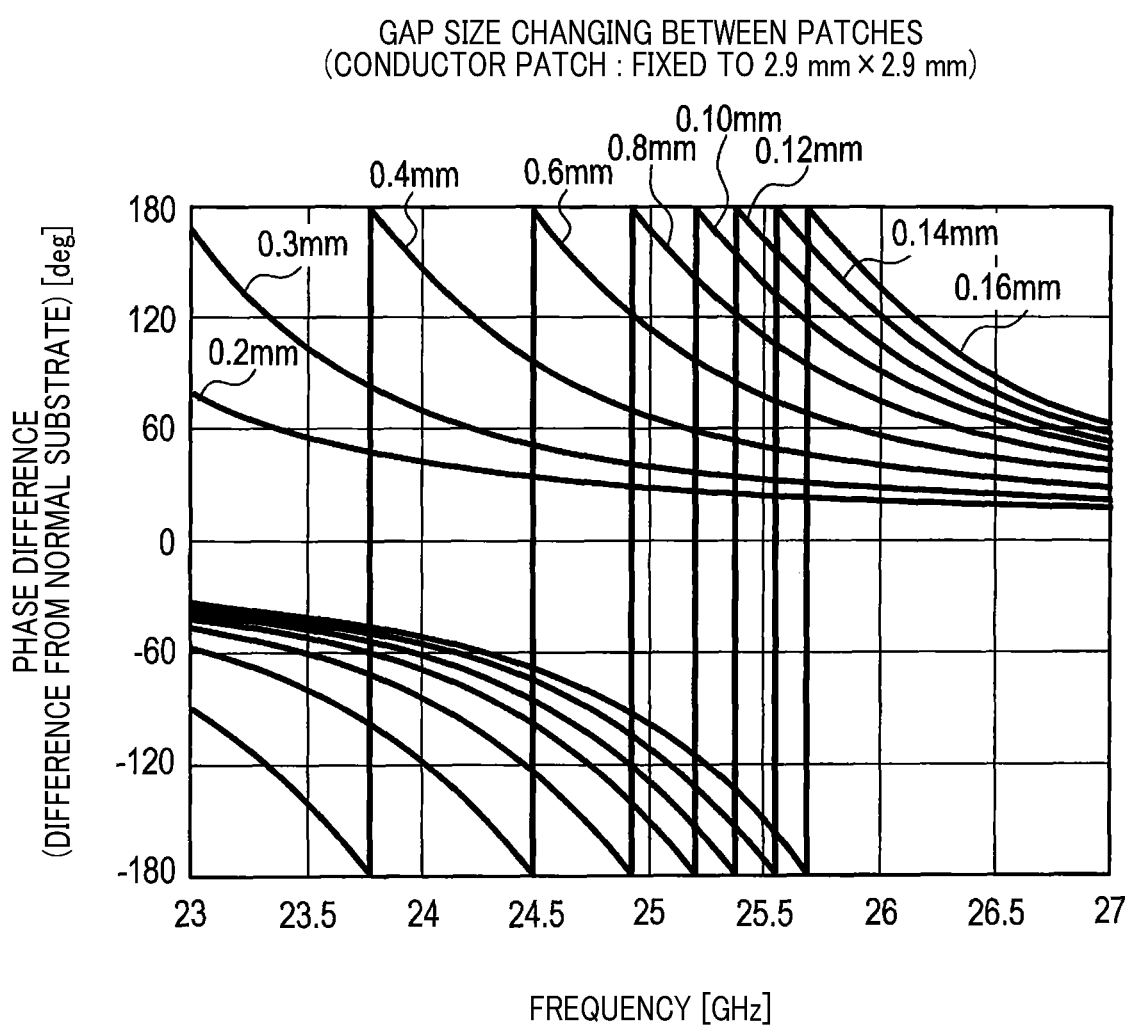
FIG. 12 is a graph showing frequency characteristics in which phases of reflected waves at the conductor patches are obtained using, as a reference, phases of the reflected waves on the normal substrate, while variously changing a dimension of a gap between patches.

(3a) In the first embodiment described above, the gap between the conductor patches P across the adjacent blocks B is set to be constant, and the dimension of the conductor patch P is changed to thereby adjust the delay phase, however, the present disclosure is not limited to this. For example, the conductor patches P of the same dimension are provided in all the blocks B, and the gap between the conductor patches P across the adjacent blocks B is changed so that the delay phase may be adjusted. In this case, the reflecting part 5 may be designed using the graph shown in FIG. 12 in place of the graph shown in FIG. 3. In FIG. 12, the dimension of the conductor patch P is fixed to 2.9 mm×2.9 mm, and the frequency characteristics of phase difference with respect to the normal substrate are obtained for each of the cases where the gap between the conductor patches is changed in the range of 0.16 mm to 0.2 mm. As shown in FIG. 12, the phase delay becomes larger as the gap is made larger if the operating frequency is constant, or as the operating frequency is made higher if the gap is constant.

(3b) In the first embodiment described above, the reflecting part 5 is designed so as to satisfy the Conditions (1) to (3), but the present disclosure is not limited to this. For example, if reflected waves can be scattered substantially evenly in various directions, all of the Conditions (1) to (3) do not necessarily have to be met.

Figure 20:
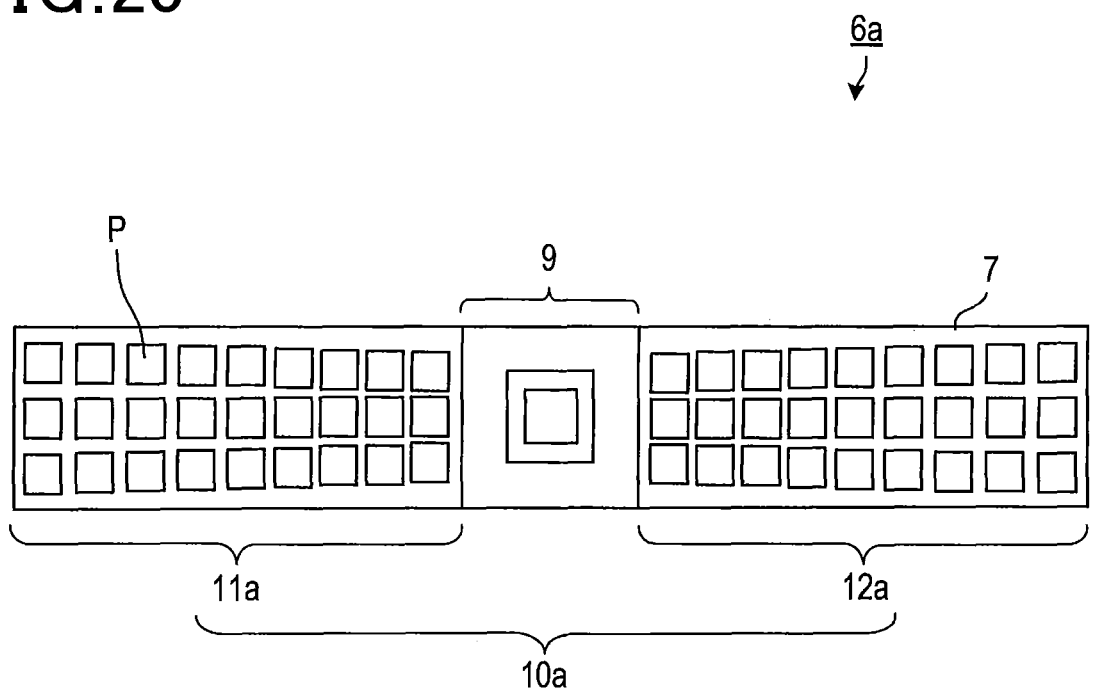
FIG. 20 is an explanatory diagram illustrating a modification of a shape of a conductor patch included in the additional function part.
Figure 21:
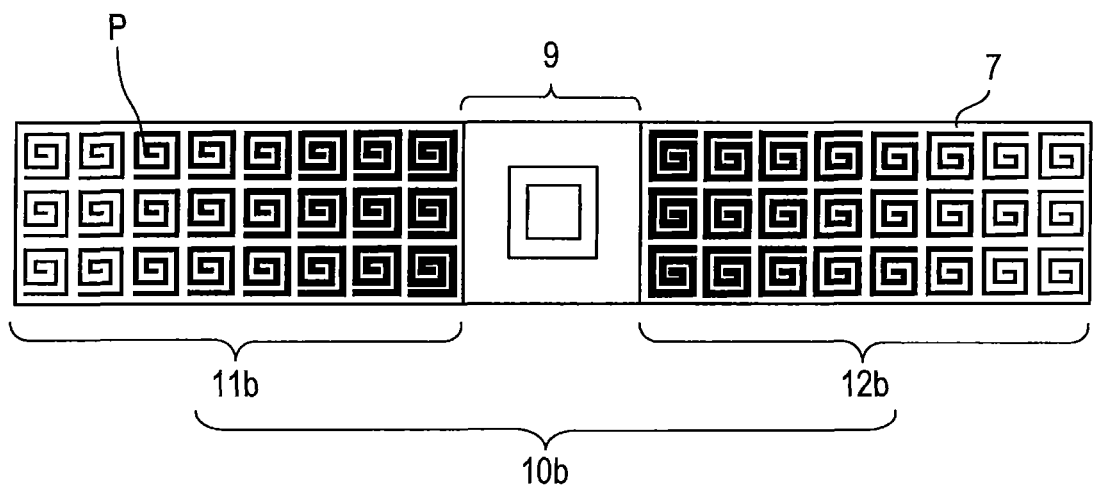
FIG. 21 is an explanatory diagram illustrating a modification of a shape of a conductor patch included in the additional function part.

(3c) In the second embodiment described above, the gap between the conductor patches P across the adjacent blocks B is set to be constant, and the dimension of the conductor patch P is changed to thereby adjust the phases of reflected waves and radiation waves, however, the present disclosure is not limited to this. For example, as in an antenna device 6a shown in FIG. 20, conductor patches P of the same dimension may be provided in all the blocks B included in portions 11a and 12a of an additional function part 10a, the gap between the conductor patches P across the adjacent blocks B may be changed, and thereby the phases of reflected waves and radiation waves may be adjusted. Further, as in an antenna device 6b shown in FIG. 21, conductor patches P each having a spiral pattern are provided in portions 11b and 12b of an additional function part 10b. Additionally, the pattern widths of the spiral patterns may be changed for each block B so as to adjust the phases of reflected waves and radiation waves. In addition, the phases of reflected waves and radiation waves may be adjusted by combinations of these methods.

Figure 22:
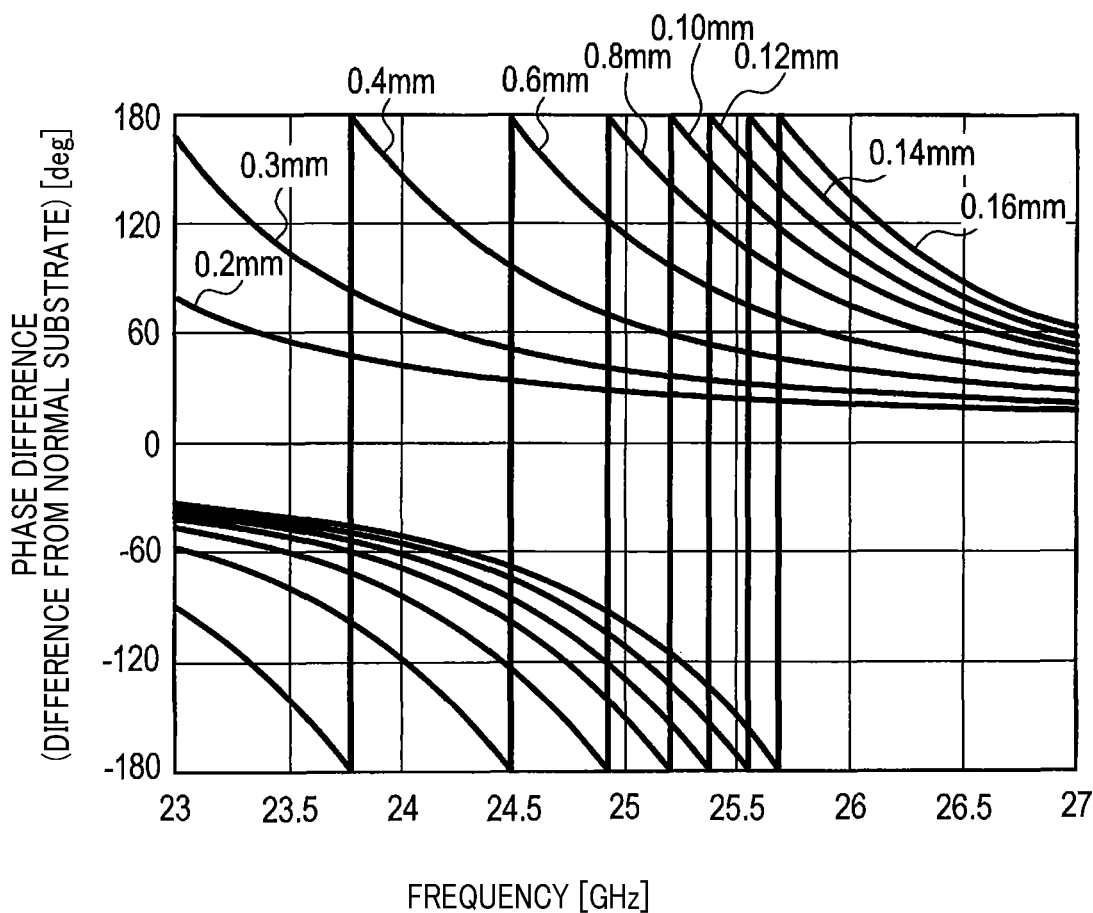
FIG. 22 is a graph showing frequency characteristics in which phases of reflected waves at conductor patches are obtained, while variously changing a dimension of a gap between patches.

(3d) In the second embodiment described above, the additional function part 10 is designed using the graph shown in FIG. 15, but the present disclosure is not limited to this. For example, in a case where the phases of reflected waves and radiation waves are adjusted by changing the gap between conductor patches P, the additional function part 10 may be designed using a graph shown in FIG. 22 in place of the graph shown in FIG. 15. Note that, in FIG. 22, the dimension of the conductor patch P is fixed to 2.9 mm×2.9 mm, and the frequency characteristics of phase difference with respect to the normal substrate are obtained for each of the cases where the gap between the conductor patches is changed in the range of 0.16 mm to 0.2 mm. As shown in FIG. 12, the phase delay becomes larger as the gap is made larger if the operating frequency is constant, or as the operating frequency is made higher if the gap is constant.

(3e) A plurality of functions of one constituent element in the embodiments described above may be realized by a plurality of constituent elements, or one function of one constituent element may be realized by a plurality of constituent elements. Furthermore, a plurality of functions of a plurality of constituent elements may be realized by one constituent element, or one function realized by a plurality of constituent elements may be realized by one constituent element. In addition, a part of the configuration in each of the above-described embodiments may be omitted. Furthermore, at least a part of the configuration in each of the above-described embodiments may be added to or replaced with the configuration in each of the above-described other embodiments. Note that the embodiments of the present disclosure include every aspect included in technical ideas specified by only wording described in the claims.

(3f) The present disclosure can be realized in the above-described antenna devices and in addition also can be realized in various forms, such as a system using the relevant antenna device as a constituent element.

The invention claimed is:

1. An antenna device comprising:
a dielectric substrate including a first surface and a second surface;
a ground plate arranged on the dielectric substrate and configured to function as an antenna ground plane;
an antenna part arranged on the second surface of the dielectric substrate and including an antenna pattern configured to function as a radiation element; and
an additional function part arranged around the antenna part and including a plurality of conductor patches each having a dimension smaller than an operating wavelength at a predetermined operating frequency, wherein
the plurality of conductor patches constituting the additional function part form a plurality of blocks aligned along a predetermined block arrangement direction, and
the additional function part sets an inductance component of the plurality of conductor patches and a capacitance component between the plurality of conductor patches by performing at least one of the following so that a phase difference of radiation waves between the blocks are realized such that radiation waves from the plurality of conductor patches, which are due to surface waves propagating on a front surface of the dielectric substrate, radiate toward a compensating direction:
1) setting dimensions of the plurality of conductor patches to be different for each of the blocks in the plurality of blocks;
2) setting gaps between conductor patches across from and adjacent to adjacent blocks to be different for each of the adjacent blocks in the plurality of blocks; and
3) configuring the plurality of conductor patches with a spiral pattern, and decreasing a pattern width of the spiral pattern for each block from a center of the dielectric substrate,
the compensation direction that is a direction providing a minimum gain in antenna characteristics in the case where the additional function part is removed.

2. The antenna device according to claim 1, wherein the plurality of blocks are configured such that phases of the radiation waves become more delayed as the block is further from a block center that is a center of the dielectric substrate in the block arrangement direction.

3. The antenna device according to claim 2, wherein the plurality of blocks are set so that phase characteristics of the radiation waves are symmetric with respect to the block center.

4. The antenna device according to claim 3, wherein the block arrangement direction coincides with a polarization direction of the antenna part.

5. The antenna device according to claim 1, wherein each of the plurality of conductor patches has a dimension not more than ¾ of the operating wavelength.

6. An antenna device comprising:
a dielectric substrate including a first surface and a second surface;

an antenna part arranged on the second surface of the dielectric substrate and including an antenna pattern configured to function as an array antenna; and a reflecting part arranged around the antenna part and including a plurality of conductor patches each having a dimension smaller than an operating wavelength and configured to function as a reflecting plate at a predetermined operating frequency, wherein the plurality of conductor patches constituting the reflecting part form a plurality of blocks formed on the second surface of the dielectric substrate on which the antenna pattern is formed and aligned along a predetermined block arrangement direction, and the reflecting part comprises an inductance component of the plurality of conductor patches and a capacitance component between the plurality of conductor patches to generate a phase difference of radiation waves between the plurality of blocks, the plurality of conductor patches are configured to generate the inductance component and the capacitance component by comprising at least one of the following:

1) dimensions that are different for each block of the plurality of blocks;
2) gaps between the plurality of conductor patches across from and adjacent to adjacent blocks that are different for each adjacent block of the plurality of blocks; and
3) a spiral pattern, and decreasing a pattern width of the spiral pattern for each block from a center of the dielectric substrate.

7. The antenna device according to claim 6, wherein the plurality of blocks are configured such that phases of the reflected waves become more delayed as the blocks are further from a block center that is a center of the dielectric substrate in the block arrangement direction.

8. The antenna device according to claim 7, wherein the plurality of blocks are configured such that phase differences of the reflected waves between the adjacent blocks become larger as the block is further from the block center.

9. The antenna device according to claim 6, wherein phases of the reflected waves are adjusted by setting dimensions of the plurality of conductor patches to be different for each of the blocks in the plurality of blocks.

10. The antenna device according to claim 6, wherein phases of the reflected waves are adjusted by setting gaps between conductor patches adjacent across the adjacent blocks to be different for each of the adjacent blocks in the plurality of blocks.

11. The antenna device according to claim 7, wherein the plurality of blocks are set so that phase characteristics of the reflected waves are symmetric with respect to the block center.

12. The antenna device according to claim 11, wherein the block arrangement direction coincides with a polarization direction of the array antenna.

13. The antenna device according to claim 6, wherein each of the plurality of conductor patches has a dimension not more than ¾ of the operating wavelength.

14. The antenna device according to claim 6, wherein the plurality of conductor patches and the plurality of blocks are arranged in a pattern that is repeated across the reflecting part.

15. The antenna device according to claim 6, further comprising
a ground plate arranged on the dielectric substrate and configured to function as an antenna ground plane.

16. The antenna device according to claim 6, wherein the reflecting part sets an inductance component of the plurality of conductor patches and a capacitance component between the plurality of conductor patches by setting gaps between conductor patches in a polarization direction to be different for each of the adjacent blocks in the plurality of blocks.

17. The antenna device according to claim 6, wherein the plurality of blocks are set so that the block arrangement direction matches a polarization direction of the antenna part.

18. An antenna device comprising:
a dielectric substrate including a first surface and a second surface;
an antenna part arranged on the second surface of the dielectric substrate and including an antenna pattern configured to function as an array antenna; and
a reflecting part arranged around the antenna part and including a plurality of conductor patches formed on the second surface of the dielectric substrate, each having a dimension smaller than an operating wavelength and configured to function as a reflecting plate at a predetermined operating frequency, wherein
the plurality of conductor patches form a plurality of blocks aligned along a predetermined block arrangement direction, and
the plurality of blocks are configured to provide reflected waves having different reflection characteristics at the operating frequency by comprising at least one of the following:
1) dimensions that are different for each block of the plurality of blocks;
2) gaps between the plurality of conductor patches across from and adjacent to adjacent blocks that are different for each adjacent block of the plurality of blocks; and
3) a spiral pattern, and decreasing a pattern width of the spiral pattern for each block from a center of the dielectric substrate.

* * * * *